No. 866,399. PATENTED SEPT. 17, 1907.
A. D. STEVENS.
VALVE.
APPLICATION FILED OCT. 5, 1904.

Witnesses
Inventor
Arthur D. Stevens

UNITED STATES PATENT OFFICE.

ARTHUR D. STEVENS, OF JACKSONVILLE, FLORIDA.

VALVE.

No. 866,399.  Specification of Letters Patent.  Patented Sept. 17, 1907.

Application filed October 5, 1904. Serial No. 227,211.

*To all whom it may concern:*

Be it known that I, ARTHUR D. STEVENS, a citizen of the United States, residing in Jacksonville, in the county of Duval and State of Florida, have invented an Improvement in Valves, of which the following description, in connection with the accompanying drawings, is a specification, like letters on the drawings representing like parts.

This invention relates to valves of that class known as globe valves, and has for its object to provide a practical double seated substantially balanced valve of the class described, which is simple in construction, efficient in use and which can be made at a minimum expense. For this purpose, the casing of the ordinary globe valve is provided with a second valve seat in line with the valve seat in the diaphragm or partition existing in globe valves as now commonly constructed, and a double puppet valve having a passage through it coöperates with said seats. The bottom of the valve casing is preferably provided with an opening into which is screwed a recessed cap or plug which forms the second valve seat, and the valve coöperating with said seat is preferably provided with guiding wings or projections. These and other features of this invention will be pointed out in the claim at the end of this specification.

Figure 1:
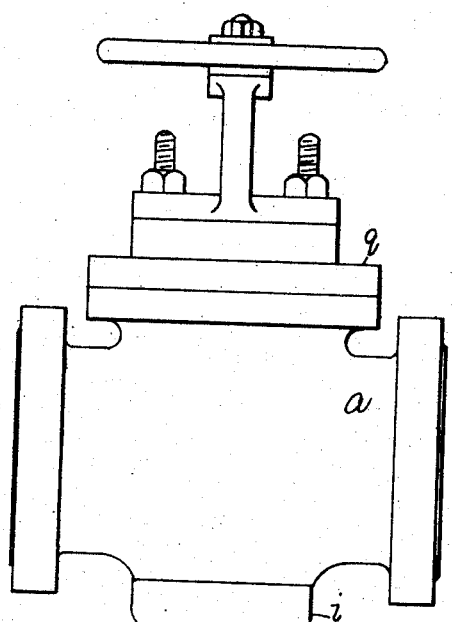
Figure 2:
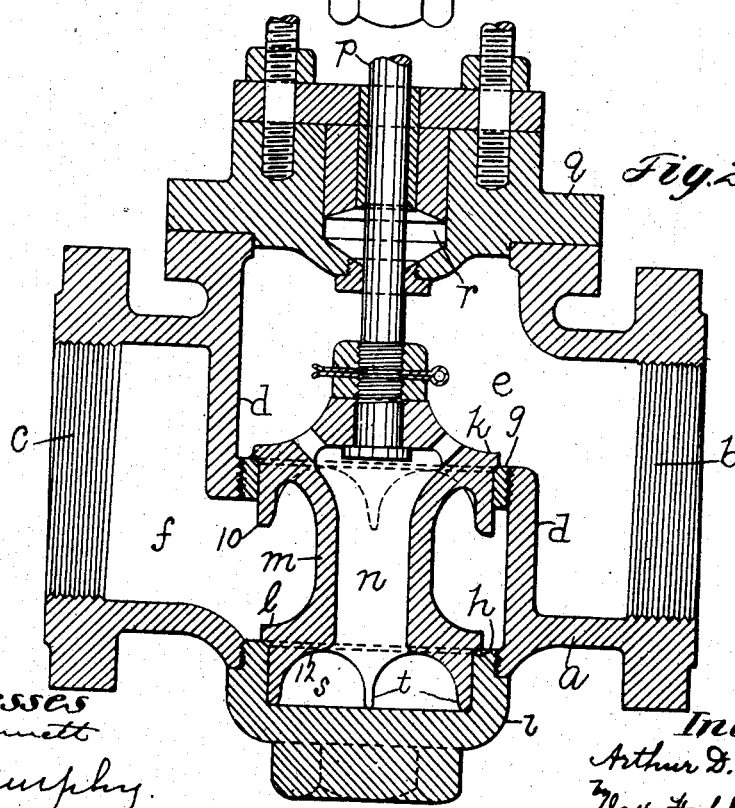

Figure 1 is an elevation of a globe valve embodying this invention, and Fig. 2, a vertical longitudinal section on an enlarged scale of the valve shown in Fig. 1.

Referring to the drawings, the casing $a$ provided with the ports $b$, $c$, substantially in line with each other, and with the partition or diaphragm $d$ forming the chambers $e, f$, and provided with the valve seat $g$, is and may be substantially the same as the casing of the ordinary globe valve.

In accordance with this invention, the casing $a$ is provided within it with a second valve seat $h$, preferably forming part of a cap or plug $i$ which is screwed into a threaded opening in the said casing. The valve seats $g$, $h$, have coöperating with them the valves $k$, $l$, connected by a body portion or stem $m$ having a steam passage $n$ which extends through said valves. The valves $k$, $l$, form a double puppet valve and may be operated in the usual manner by a spindle $p$ which is extended through a cover or cap $q$ provided with a suitable stuffing box $r$.

The removable cap or plug $i$ may and preferably will be provided with a recess or pocket $s$ for the reception of guiding wings or projections $t$ on the valve $l$, the valve $k$ being also preferably provided with guiding wings 10. The wings $t$ may be made as herein shown, being separated from each other and connected by curved walls 12 which form substantially arch-shaped spaces to afford a gradual supply of steam as the valve is opened, but while I may prefer to employ said wings, I do not desire to limit myself in this respect as they may be omitted.

By reference to Fig. 2, it will be seen that the steam from the chamber $e$ can pass down through the hollow stem of the puppet valve, with the result that the pressure upon the valves $k$, $l$, is balanced or substantially balanced, thereby enabling the valve to be quickly and easily operated.

From the above description, it will be seen that the valve seat $h$ is formed on the removable cap or plug $i$, which enables the patterns employed in the manufacture of the ordinary globe valve to be utilized to produce a balanced throttle valve at a minimum expense, and while I prefer to make the seat a part of the removable cap $i$, I do not desire to limit my invention in this respect.

Claim.

1. In a valve of the class described, in combination, a valve casing having an inlet and an outlet port substantially opposite and in line with each other, a partition or diaphragm within said casing provided with a valve seat, a plug or cap removably secured to the bottom of said casing intermediate of said ports and having a valve seat substantially in line with the valve seat in said partition, and a double puppet valve coöperating with said seats and movable downward to engage said seats and provided with a passage which communicates with the opposite sides of said valve, both in the closed and opened positions of said valve, substantially as described.

2. In a valve of the class described, in combination, a valve casing having an inlet and an outlet port, a partition or diaphragm within said casing provided with a valve seat, a recessed plug or cap secured to said casing and having a valve seat substantially in line with the valve seat in said partition, and a double puppet valve coöperating with said seats and movable downward to engage said seats and provided with a passage which communicates with the opposite sides of said valve in all positions of said valve, substantially as described.

In testimony whereof, I have signed my name to this specification in the presence of two subscribing witnesses.

ARTHUR D. STEVENS.

Witnesses:
 JNO. K. STRANGE,
 A. R. MERRILL.